T. L. GOOD.
SPRING WHEEL.
APPLICATION FILED FEB. 24, 1913.
1,133,854.
Patented Mar. 30, 1915.
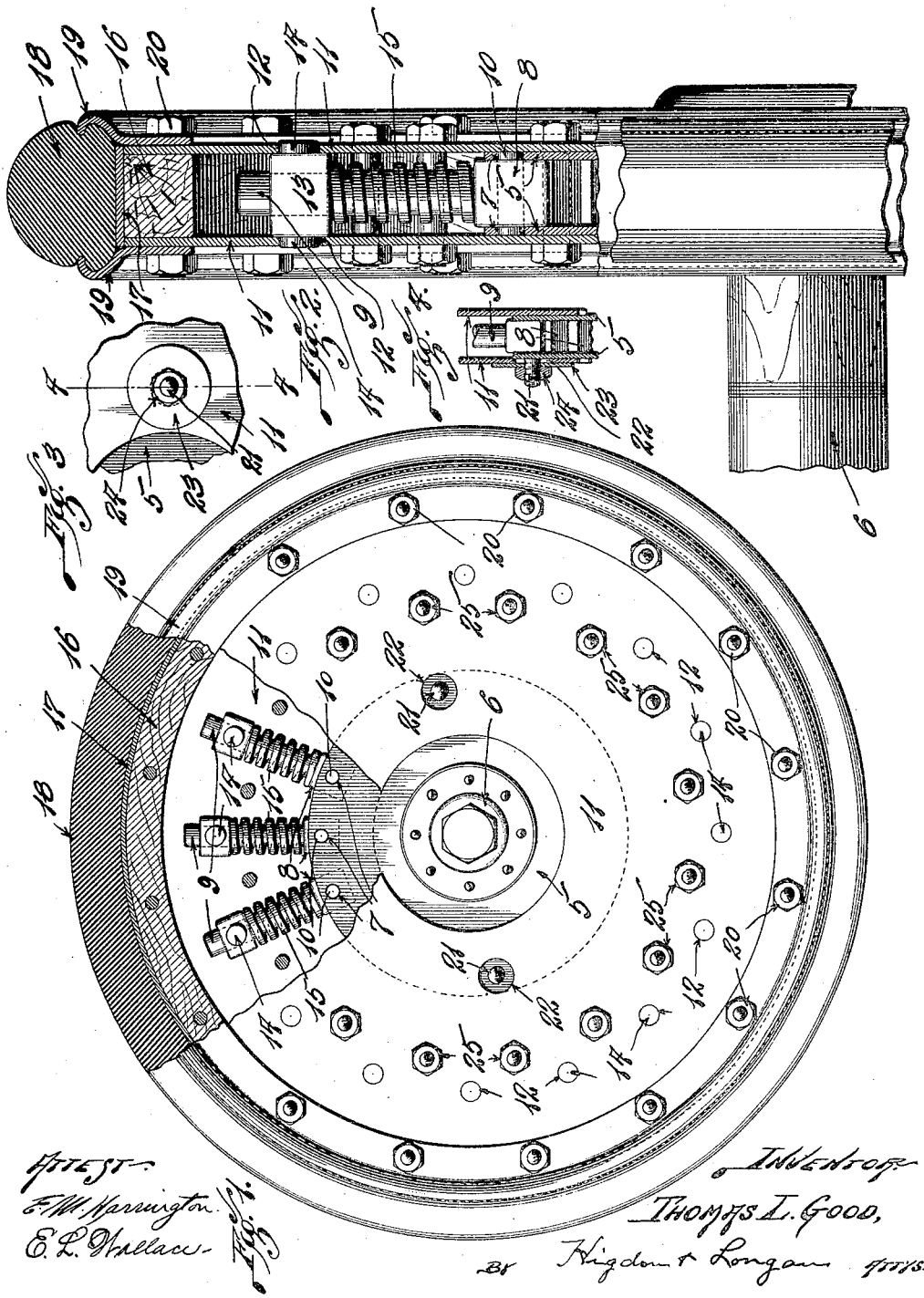

UNITED STATES PATENT OFFICE.

THOMAS L. GOOD, OF EDWARDSVILLE, ILLINOIS, ASSIGNOR OF ONE-THIRD TO HENRY P. HOTZ AND ONE-THIRD TO ORIE T. DUNLAP, BOTH OF EDWARDSVILLE, ILLINOIS.

SPRING-WHEEL.

1,133,854.    Specification of Letters Patent.    Patented Mar. 30, 1915.

Application filed February 24, 1913. Serial No. 750,263.

*To all whom it may concern:*

Be it known that I, THOMAS L. GOOD, a citizen of the United States, and resident of Edwardsville, Madison county, Illinois, have invented certain new and useful Improvements in Spring-Wheels, of which the following is a specification containing a full, clear, and exact description, reference being had to the accompanying drawings, forming a part hereof.

My invention relates to improvements in spring wheels, and the object of my invention is to provide an improved construction of spring wheels which will possess a maximum of resiliency and whose construction affords ready repair and adjustment.

With the above purposes in view my invention consists in certain novel features of construction and arrangement of parts as will be hereinafter more fully described, pointed out in the claim and illustrated by the accompanying drawings in which, Figure 1 is an outside face view of one of my improved wheels partly in section; Fig. 2 is an enlarged fragmental edge elevation of one of my improved wheels which is partly in section; Fig. 3 is a fragmental face elevation of one of the stop-pins and dust guards; and Fig. 4 is a vertical sectional elevation taken on the line 4—4 of Fig. 3.

Referring by numerals to the accompanying drawings: 5—5 designates the hub rings to one of which is secured a hub cap 6.

Carried by the pair of hub rings 5 is the ordinary bearing barrel or thimble, not shown.

Formed in the pair of rings 5 adjacent their outer margins is a plurality of pin seats 7, which seats are arranged in axially alining pairs.

8 designates the bases of the spokes 9, which bases are substantially square and provided with openings through which pins 10 are inserted so that the spokes and their bases will be secured to the hub rings 5.

11 designates the outer rings which form the sides of my wheel.

Formed in the rings 11 are the holes 12. These holes axially aline in the two rings and are in radial alinement with the seats 7 in the hub rings 5.

13 designates a block having the stubs 14 which are placed in the holes 12 of the outer rings. One of these blocks is placed in each pair of the holes 12, and formed through each block is an opening through which the spoke 9 operates.

Embracing each spoke and impinging between each base 8 and each block 13 is an extensile coil spring 15.

Secured between the outer rings 11 adjacent their peripheries is a felly 16, the periphery of which is faced with a metallic ring 17 forming the base of a rubber tire 18.

19 designates the tire clenching devices which are in the form of rings, and secured to the outer rings 11 by means of the bolts 20.

Secured to at least one of the hub rings 5 is a pair of diametrically opposite stop pins 21, and axially alining with each of the pins 21 and formed in the outer rings 11 are the openings 22 which are of considerably greater dimensions than the pins 21.

23 designates a washer which is secured over each pin 21, and whose function is to close the openings 22 to prevent the ingress of dust, dirt and water to the interior of the wheel.

Each of the washers is held in place by a nut 24.

From the construction just described the wheels, especially the driven wheel as in motor driven vehicles, are more or less resilient so that when the tread of the wheel is advanced the load upon the axle will be taken up gradually.

In order to hold the outer rings in fixed axial relations relative to each other, I provide the stay-bolts 25 which prevent springing of the outer rings so as not to unseat the stubs 14 or the pins 10.

I claim:

A cushion wheel, comprising a hub and a rim, a pair of spaced rings secured to the hub, a pair of spaced rings secured to the rim and overlapping the rings secured to the hub, a plurality of spokes having their inner ends pivotally mounted between said rings secured to the hub, a plurality of blocks pivotally mounted between the rings secured to the rim and arranged to slidably support the outer ends of the spokes, extensile coil springs surrounding the spokes and impinging said blocks and the pivotal supports of the spokes, there being openings in the rings secured to the rim, pins carried by the rings secured to the hub, and washers carried by said pins for closing said openings around said pins, said openings being larger than said pins to permit limited movements of the rings relative to each other.

In testimony whereof, I have signed my name to this specification, in presence of two subscribing witnesses.

THOMAS L. GOOD.

Witnesses:
J. B. DALE,
ALOS SCHMITT.

Copies of this patent may be obtained for five cents each, by addressing the "Commissioner of Patents, Washington, D. C."